(12) United States Patent
Sago

(10) Patent No.: US 7,867,326 B2
(45) Date of Patent: Jan. 11, 2011

(54) INK SET FOR INK-JET RECORDING, INK-JET RECORDING APPARATUS, METHOD OF INK-JET RECORDING, METHOD OF EVALUATING INK SET FOR INK-JET RECORDING, AND METHOD OF MANUFACTURING INK SET FOR INK-JET RECORDING

(75) Inventor: Hiromitsu Sago, Tokai (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 15 days.

(21) Appl. No.: 12/121,089

(22) Filed: May 15, 2008

(65) Prior Publication Data

US 2008/0286468 A1 Nov. 20, 2008

(30) Foreign Application Priority Data

May 16, 2007 (JP) .............................. 2007-131067

(51) Int. Cl.
*C09D 11/02* (2006.01)
(52) U.S. Cl. ................. 106/31.27; 106/31.13; 106/31.6
(58) Field of Classification Search .............. 106/31.13, 106/31.27, 31.6
See application file for complete search history.

(56) References Cited

U.S. PATENT DOCUMENTS

| | | | |
|---|---|---|---|
| 6,702,882 B2 | 3/2004 | Yakushigawa et al. | |
| 6,866,380 B2 | 3/2005 | Yakushigawa et al. | |
| 2001/0030678 A1* | 10/2001 | Katsuragi et al. | 347/101 |
| 2002/0041316 A1* | 4/2002 | Katsuragi et al. | 347/96 |
| 2007/0186807 A1 | 8/2007 | Goto et al. | |
| 2007/0186808 A1 | 8/2007 | Hamajima et al. | |
| 2008/0286465 A1 | 11/2008 | Sago | |

OTHER PUBLICATIONS

"Evolution of Gas Fastness of Printed Images by Ink Jet Printers," Journal of the Society of Photographic Science and Technology of Japan, vol. 69, No. 2, 2006, pp. 88-90.
"Gas-Fastness Evaluating Methods for Image Stability," Journal of the Society of Photographic Science and Technology of Japan, vol. 69, No. 2, 2006, pp. 91-95, with partial translation.

* cited by examiner

*Primary Examiner*—Jerry Lorengo
*Assistant Examiner*—Veronica Faison Gee
(74) *Attorney, Agent, or Firm*—Banner & Witcoff, Ltd.

(57) ABSTRACT

An ink set for ink-jet recording contains a yellow ink, a magenta ink, and a cyan ink. Ink sets capable of forming composite black images having good color deterioration properties and ozone resistance may be prepared by selecting an appropriate combination of a yellow ink, a magenta ink, and a cyan ink.

19 Claims, 1 Drawing Sheet

INK SET FOR INK-JET RECORDING, INK-JET RECORDING APPARATUS, METHOD OF INK-JET RECORDING, METHOD OF EVALUATING INK SET FOR INK-JET RECORDING, AND METHOD OF MANUFACTURING INK SET FOR INK-JET RECORDING

CROSS-REFERENCE TO RELATED APPLICATIONS

This application claims priority from Japanese Patent Application No. 2007-131067 filed on May 16, 2007. The entire subject matter of the Japanese Patent Application is incorporated herein by reference.

BACKGROUND

Generally, ink-jet recording is performed with an ink set comprising three colors of ink, namely a yellow ink, a magenta ink, and a cyan ink. A color image is formed by applying the three colors of ink to a substrate. Further, in the ink-jet recording, a black color (composite black) is formed by a mixing or an overstriking of the yellow ink, the magenta ink, and the cyan ink. Images formed by the ink-jet recording are prone to color deterioration over time. Due to the deterioration of the color, a color balance of the image may be changed from that of initial image shortly after recording. One proposal to address the problem of the color deterioration has been to provide an ink set which controls ΔE (color difference) in L*a*b* calorimetric system before and after a light resistance test, and also a reflection density residual ratio. The ink set is a combination of inks whose ΔE is 10 or less and reflection density residual ratio is at least 70%.

However, the images formed using such ink sets are prone to ozone degradation. Further, the ink set is focused on the deterioration of individual ink colors. Therefore, the ink set does not solve the problem of a color deterioration balance among images formed by inks of different colors. In addition, composite black images may occasionally become colored over time due to uneven deterioration of the individual color inks. The color generated because of the deterioration of the composite black is more readily visible than a change of a color in a color image.

SUMMARY

An ink set for ink-jet recording containing a yellow ink, a magenta ink, and a cyan ink is capable of forming images having good color deterioration properties and ozone resistance. Composite black images formed by mixing or overstriking the yellow ink, the magenta ink, and the cyan ink are less prone to developing color over time.

General Overview

An ink set for ink-jet recording capable of forming images having good color deterioration properties and ozone resistance may be prepared by selecting an appropriate combination of a yellow ink, a magenta ink, and a cyan ink which exhibits certain ozone resistance properties.

Illustrative Aspects

An ink set for ink jet recording comprises a yellow ink, a magenta ink, and a cyan ink. A composite black patch may be formed on glossy paper by mixing or overstriking the yellow ink, the magenta ink, and the cyan ink. When an ozone resistance evaluation test is carried out on the composite black patch, a greatest difference of an optical density (OD) value reduction rate (%) among a yellow component, a magenta component, and a cyan component of a composite black patch is 10 or less in each of the following conditions of (I) to (IV).

(I) temperature: about 20° C., relative humidity: about 45% ozone concentration: about 2 ppm, time: about 7 hours (II) temperature: about 20° C., relative humidity: about 70% ozone concentration: about 2 ppm, time: about 7 hours (III) temperature: about 30° C., relative humidity: about 45% ozone concentration: about 2 ppm, time: about 7 hours (IV) temperature: about 30° C., relative humidity: about 70% ozone concentration: about 2 ppm, time: about 7 hours An ink-jet recording apparatus comprises the ink set. The ink-jet recording apparatus comprises a yellow ink storage portion, a magenta ink storage portion, and a cyan ink storage portion. The yellow ink is mounted to the yellow ink storage portion, the magenta ink is mounted to the magenta ink storage portion, and the cyan ink is mounted to the cyan ink storage portion. When an ozone resistance evaluation test is carried out on a composite black patch formed by mixing or overstriking the yellow ink, the magenta ink, and the cyan ink, the greatest difference of an optical density (OD) value reduction rate (%) among the yellow component, the magenta component, and the cyan component of the composite black patch is 10 or less in each of (I) to (IV) as described above.

A method of ink-jet recording comprises performing ink-jet recording with an ink set for ink-jet recording comprising a yellow ink, a magenta ink, and a cyan ink. When an ozone resistance evaluation test is carried out on a composite black patch formed by mixing or overstriking the yellow ink, the magenta ink, and the cyan ink, the greatest difference of an optical density (OD) value reduction rate (%) among the yellow component, the magenta component, and the cyan component of the composite black patch is 10 or less in each of (I) to (IV) as described above.

A method of evaluating an ink set for ink-jet recording comprises forming a composite black patch on a glossy paper by mixing or overstriking the yellow ink, the magenta ink, and the cyan ink. The method also comprises evaluating ozone resistance of the composite black patch in the above described conditions of (I) to (IV) and obtaining an OD value reduction rate (%) among the yellow component, the magenta component, and the cyan component of the composite black patch.

A method of manufacturing an ink set for ink-jet recording comprises preparing an ink set for ink-jet recording comprising a yellow ink, a magenta ink, and a cyan ink, and evaluating the ink set. The ink set is evaluated by forming a composite black patch on a glossy paper by mixing or overstriking the yellow ink, the magenta ink, and the cyan ink. The method also comprises evaluating ozone resistance in the above-described conditions of (I) to (IV) and obtaining an OD value reduction rate (%) among the yellow component, the magenta component, and the cyan component of the composite black. The method also comprises selecting a combination of yellow ink, magenta ink, and cyan ink such that a greatest difference of an OD value reduction rate (%) among the yellow component, the magenta component, and the cyan component of the composite black patch is 10 or less in each of (I) to (IV) as described above.

DETAILED DESCRIPTION

Figure 1:
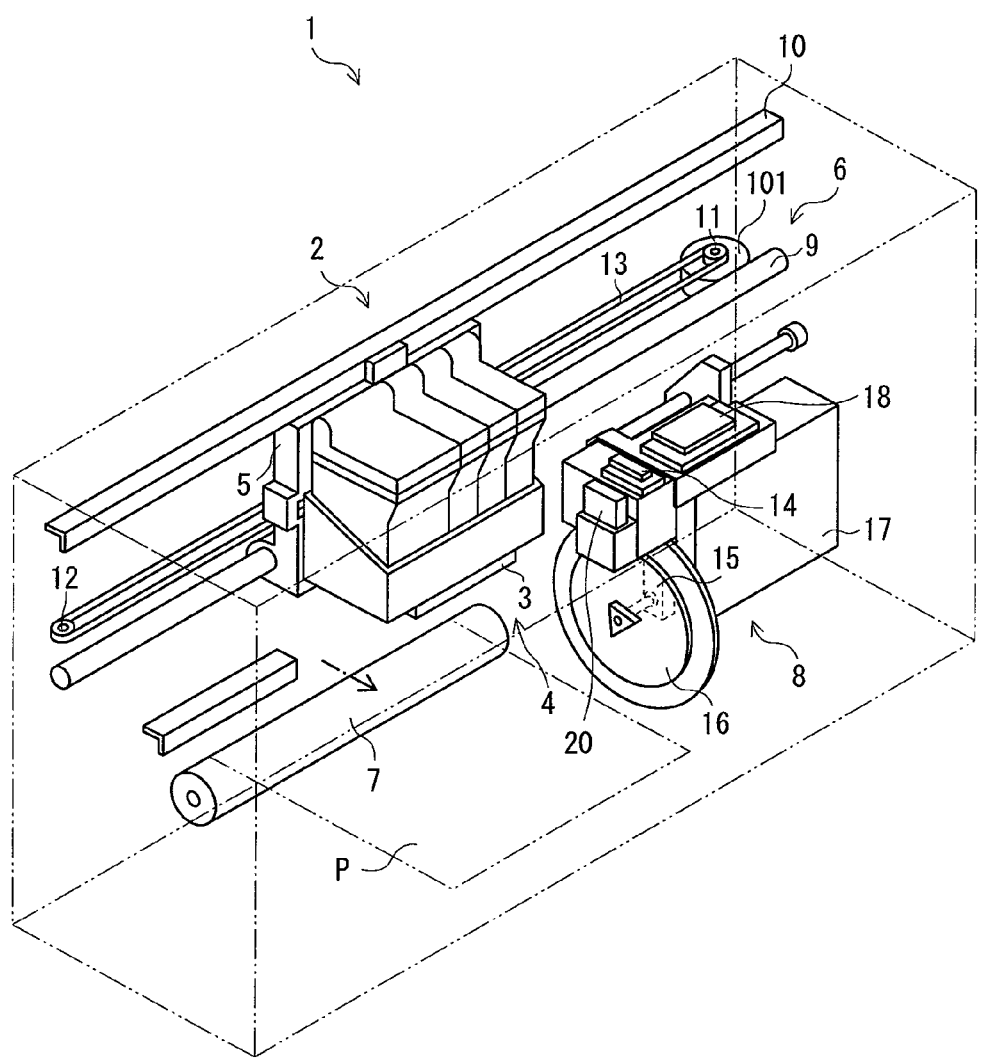
FIG. 1 is a schematic perspective view showing a construction of an example of an ink-jet recording apparatus.

A composite black may be formed by mixing or overstriking a yellow ink, a magenta ink, and a cyan ink. A construction ratio of an ink dot of each color at the time of the mixing or the overstriking may be decided suitably according to a performance of an ink-jet recording apparatus, etc. The construction ratio, e.g., a volume ratio of a yellow ink dot ($V_Y$), a magenta ink dot ($V_M$), and a cyan ink dot ($V_C$) ($V_Y$:$V_M$:$V_C$) is about 0.7 to about 1.3: about 0.7 to about 1.3: about 0.7 to about 1.3.

An ink set comprises the yellow ink, the magenta ink, and the cyan ink. Details of the yellow ink, the magenta ink, and the cyan ink are described later.

When an ozone resistance evaluation test is carried out on a composite black patch formed on a glossy paper by mixing or overstriking the yellow ink, the magenta ink, and the cyan ink in the later described conditions of (I) to (IV), the greatest difference of an OD value reduction rate (%) among the yellow component, the magenta component, and the cyan component of the composite black patch is 10 or less. Hereinafter, the ink set, in which the greatest difference of the OD value reduction rate (%) among the yellow component, the magenta component, and the cyan component of the composite black patch is 10 or less in each of conditions of (I) to (IV), is referred to as the ink set including "property 1."

The ozone resistance evaluation test may be carried out in the following four conditions of (I) to (IV) corresponding to a storage environment of an actual ink-jet recording object. Ink sets which exhibit "property 1" are capable of producing composite black images which are less prone to developing undesired color when the ink-jet recording object is stored under a variety of types of environment, such as a cold region or a warm region, summer or winter, and a dry season or a rain season.

(I) temperature: about 20° C., relative humidity: about 45% ozone concentration: about 2 ppm, time: about 7 hours (II) temperature: about 20° C., relative humidity: about 70% ozone concentration: about 2 ppm, time: about 7 hours (III) temperature: about 30° C., relative humidity: about 45% ozone concentration: about 2 ppm, time: about 7 hours (IV) temperature: about 30° C., relative humidity: about 70% ozone concentration: about 2 ppm, time: about 7 hours In the ozone resistance evaluation test, an exposure amount of ozone under ozone concentration 40 ppm in one hour is considered to be corresponding to an exposure amount of ozone under the storage environment of the actual ink-jet recording object in one year (Journal of The Society of Photographic Science and Technology of Japan, Vol. 69, No. 2, 2006, p. 88-90, and p. 91-95).

The ozone resistance evaluation test may be carried out, for example, with a commercially available ozone weather meter. The ozone weather meter is not particularly limited and includes, for example, OMS-H (trade name) manufactured by SUGA TEST INSTRUMENTS CO., LTD.

For the measurement of the OD value of the composite black patch in the ozone resistance evaluation test, for example, a patch having an optical density (OD) value of about 1.0 may be used out of gradation sample patches of the composite black formed on the glossy paper.

An example of the glossy paper comprises a base paper provided with a coat layer which gives surface smoothness. Specifically, examples of the glossy paper include, without limitation, a glossy photo paper BP60GLA (trade name) manufactured by Brother Industries, Ltd., a premium glossy photo paper for color ink-jet recording manufactured by Oji Paper Co., Ltd., a high-definition super glossy photo paper for ink-jet printer manufactured by KOKUYO Co., Ltd., a PhotolikeQP (photo image quality) series manufactured by Konica Minolta Holdings Inc., Photo Finish Pro, Photo Finish Advance, FUJIFILM Premium Glossy Paper (trade names) of a KASSAI® series manufactured by FUJIFILM Corporation.

The OD value reduction rate (%) of the yellow component in the composite black patch is a reduction rate (%) of the OD value corresponding to the yellow component in the composite black patch before and after the ozone resistance evaluation test. The OD value reduction rate (%) of the yellow component in the composite black patch may be obtained with the following formulae by measuring the OD value corresponding to the yellow component with spectral sensitivity characteristic of status A based on ISO5/3 before and after the ozone resistance evaluation test. With respect to the magenta component and the cyan component, it may be explained in the same manner as in the yellow component.

$$A_y = ((OD_{y0} - OD_{y1})/OD_{y0}) \times 100$$

$$A_m = ((OD_{m0} - OD_{m1})/OD_{m0}) \times 100$$

$$A_c = ((OD_{c0} - OD_{c1})/OD_{c0}) \times 100$$

$A_y$: OD value reduction rate (%) of yellow component $A_m$: OD value reduction rate (%) of magenta component $A_c$: OD value reduction rate (%) of cyan component $OD_{y0}$: OD value of yellow component in composite black patch before ozone resistance evaluation test $OD_{y1}$: OD value of yellow component in composite black patch after ozone resistance evaluation test $OD_{m0}$: OD value of magenta component in composite black patch before ozone resistance evaluation test $OD_{m1}$: OD value of magenta component in composite black patch after ozone resistance evaluation test $OD_{c0}$: OD value of cyan component in composite black patch before ozone resistance evaluation test $OD_{c1}$: OD value of cyan component in composite black patch after ozone resistance evaluation test The measurement of the OD value may be carried out, for example, with a commercially available spectrophotometer. The spectrophotometer is not particularly limited and includes, for example, Spectrolino (trade name) manufactured by Gretag-Macbeth.

When the ozone resistance evaluation test is carried out on the composite black patch formed on the glossy paper by the yellow ink, the magenta ink, and the cyan ink in the conditions of (I) to (IV), the greatest difference of the OD value reduction rate (%) among conditions of (I) to (IV) is 10 or less in each of the yellow component, the magenta component, and the cyan component. This property enables composite black images formed on ink-jet recording objects to exhibit substantially uniform color deterioration even when the ink jet recording objects are stored under different types of environment such as a cold region or a warm region, summer or winter, and a dry season or a rain season. Hereinafter, the ink set, in which the greatest difference of the OD value reduction rate (%) among conditions of (I) to (IV) is 10 or less in each of the yellow component, the magenta component, and the cyan component, is referred to as the ink set including "property 2."

When the ozone resistance evaluation test is carried out on a mono-color yellow patch, a mono-color magenta patch, and a mono-color cyan patch each formed on the glossy paper by the yellow ink, the magenta ink, and the cyan ink in the conditions of (I) to (IV), the ink set often exhibits the following properties (a) to (c) in each of conditions (I) to (IV). This property enables images formed from the ink set to exhibit reduced change in color balance over time. Hereinafter, the properties (a) to (c) are collectively referred to as "property 3."

(a) about $-10 \leq B_Y - B_M \leq$ about 20

(b) about $-10 \leq B_Y - B_C \leq$ about 20

(c) about $-10 \leq B_M - B_C \leq$ about 15

$B_Y$: OD value reduction rate (%) of mono-color yellow patch $B_M$: OD value reduction rate (%) of mono-color magenta patch $B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test $OD_{Y1}$: OD value of mono-color yellow patch after ozone resistance evaluation test $OD_{M0}$: OD value of mono-color magenta patch before ozone resistance evaluation test $OD_{M1}$: OD value of mono-color magenta patch after ozone resistance evaluation test $OD_{C0}$: OD value of mono-color cyan patch before ozone resistance evaluation test $OD_{C1}$: OD value of mono-color cyan patch after ozone resistance evaluation test The OD value reduction rate (%) of the mono-color yellow patch is a reduction rate (%) of the OD value of the mono-color yellow patch formed by the yellow ink before and after the ozone resistance evaluation test. For the measurement of the OD value of the mono-color yellow patch in the ozone resistance evaluation test, for example, a patch having an optical density (OD) value of about 1.0 may be used out of gradation sample patches of yellow formed on the glossy paper. The measurement of the OD value may be carried out with the spectrophotometer, for example. With respect to the magenta ink, and the cyan ink, it may be explained in the same manner as in the yellow.

When the ozone resistance evaluation test is carried out on the mono-color yellow patch, the mono-color magenta patch, and the mono-color cyan patch each formed on the glossy paper by the yellow ink, the magenta ink, and the cyan ink in the conditions of (I) to (IV), the ink set may include the following properties (d) to (f) in each of conditions (I) to (IV). Ink sets exhibiting such properties are capable of forming images exhibiting further reduced deterioration of color balance. Hereinafter, the properties (d) to (f) are collectively referred to as "property 4."

(d) about $-10 \leq B_Y - B_M \leq$ about 10

(e) about $-10 \leq B_Y - B_C \leq$ about 10

(f) about $-10 \leq B_M - B_C \leq$ about 15

When the ozone resistance evaluation test is carried out on the mono-color yellow patch, the mono-color magenta patch, and the mono-color cyan patch each formed on the glossy paper by the yellow ink, the magenta ink, and the cyan ink in the conditions of (I) to (IV), the greatest difference of the OD value reduction rate (%) among conditions of (I) to (IV) usually is 20 or less in each of the mono-color yellow patch, the mono-color magenta patch, and the mono-color cyan patch. This property enables each of the colors in images to exhibit uniform color deterioration, even when the ink jet recording objects are stored under different types of environment such as a cold region or a warm region, summer or winter, and a dry season or a rain season. Hereinafter, the ink set, in which the greatest difference of the OD value reduction rate (%) among conditions of (I) to (IV) is 20 or less in each of the mono-color yellow patch, the mono-color magenta patch, and the mono-color cyan patch, is referred to as the ink set including "property 5."

The particular compositions of the yellow ink, the magenta ink, and the cyan ink are not limited as long as the ink set exhibits at least "property 1" as described herein. Each of the inks usually comprises water, a coloring agent, and a water-soluble organic solvent.

An example of the coloring agent used for the three colors of ink includes, without limitation, a water-soluble dye such as a direct dye, an acid dye, a basic dye, a reactive dye, etc. Further, specific examples of the coloring agent include, without limitation, an azo dye, a metal complex dye, a naphthol dye, an anthraquinone dye, an indigo dye, a carbonium dye, a quinonimine dye, a xanthene dye, an aniline dye, a quinoline dye, a nitro dye, a nitroso dye, a benzoquinone dye, a naphthoquinone dye, a phthalocyanine dye, a metal phthalocyanine dye, etc. One of the coloring agent may be used alone or two or more of the coloring agents may be used in combination.

An example of the coloring agent used for the yellow ink (a yellow coloring agent) includes a yellow dye. Examples of the yellow dye include, without limitation, the direct dye such as C. I. Direct Yellow 12, 24, 26, 27, 28, 33, 39, 58, 86, 98, 100, 132, and 142; the acid dye such as C. I. Acid Yellow 3, 11, 17, 19, 23, 25, 29, 38, 42, 49, 59, 61, 71, and 72; the basic dye such as C. I. Basic Yellow 40; and the reactive dye such as C. I. Reactive Yellow 2.

Examples of the coloring agent used for the magenta ink (a magenta coloring agent) include a monoazo type dye, a magenta dye, etc. An example of the magenta dye which is excellent in an ozone resistance is described in co-pending application no. U.S. 2007/0186807 A1, which is hereby incorporated by reference in its entirety. The magenta dye may be represented by the following general formula (M-1).

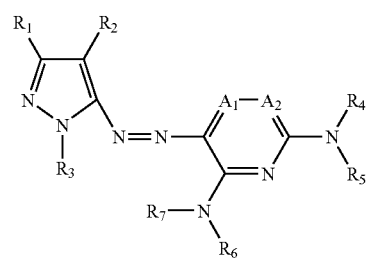

(M-1)

wherein $R_1$ represents a hydrogen atom, an optionally substituted alkyl group, or an optionally substituted aryl group; $R_2$ represents a hydrogen atom, a halogen atom, or a cyano group; $R_3$ represents a hydrogen atom, an optionally substituted alkyl group, an optionally substituted aryl group, or an optionally substituted heterocyclic group; $R_4$, $R_5$, $R_6$, and $R_7$ each independently represent a hydrogen atom, an optionally substituted alkyl group, an optionally substituted aryl group, an optionally substituted heterocyclic group, an optionally substituted sulfonyl group, or an optionally substituted acyl group, provided that $R_4$, $R_5$, $R_6$, and $R_7$ may be the same or different, that $R_4$ and $R_5$ are not simultaneously hydrogen atoms, and that $R_6$ and $R_7$ are not simultaneously hydrogen atoms; and $A_1$ and $A_2$ both represent optionally substituted carbon atoms, or one of $A_1$ and $A_2$ represents an optionally substituted carbon atom and the other represents a nitrogen atom.

A specific example of the dye (M-1) includes compounds represented by the following chemical formulae (M-1a) and (M-1b).

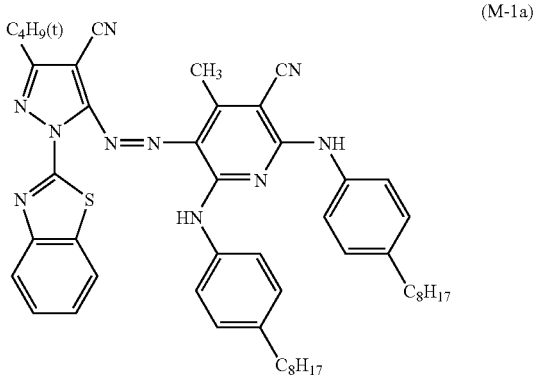

(M-1a)

The compound represented by the chemical formula (M-1a) is, in the general formula (M-1), in a state in which $R_1$ is a tert-butyl group, $R_2$ is a cyano group, $R_3$ is a benzothiazole-2-yl group, $R_4$ is a hydrogen atom, $R_5$ and $R_6$ are a p-octylphenyl group, $R_7$ is a hydrogen atom, $A_1$ is a carbon atom substituted by a methyl group, and $A_2$ is a carbon atom substituted by a cyano group.

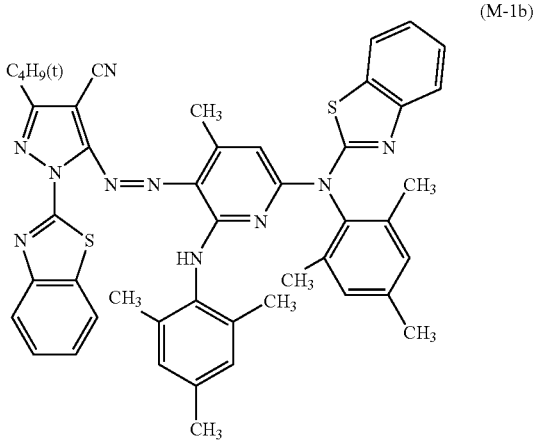

(M-1b)

The compound represented by the chemical formula (M-1b) is, in the general formula (M-1), in a state in which $R_1$ is a tert-butyl group, $R_2$ is a cyano group, $R_3$ and $R_4$ are a benzothiazole-2-yl group, $R_5$ and $R_6$ are a mesityl group, $R_7$ is a hydrogen atom, $A_1$ is a carbon atom substituted by a methyl group, and $A_2$ is a carbon atom.

The magenta dye may be represented by the following general formula (M-2).

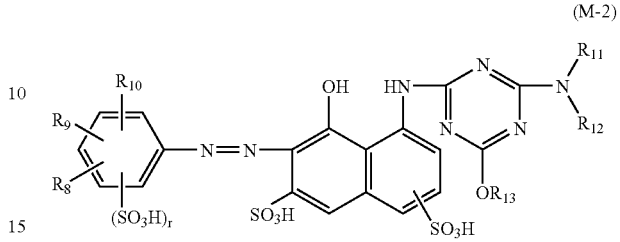

(M-2)

wherein $R_8$, $R_9$, and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate ester group, an optionally substituted alkyl sulfonyl group, an optionally substituted aryl sulfonyl group, a carboxyl group or a carboxylate ester group, provided that $R_8$, $R_9$, and $R_{10}$ may be the same or different; r is the number of 0, 1, or 2; and $R_{11}$, $R_{12}$, and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group, provided that $R_{11}$, $R_{12}$, and $R_{13}$ may be the same or different.

A specific example of the dye (M-2) includes a compound represented by the following chemical formula (M-2a).

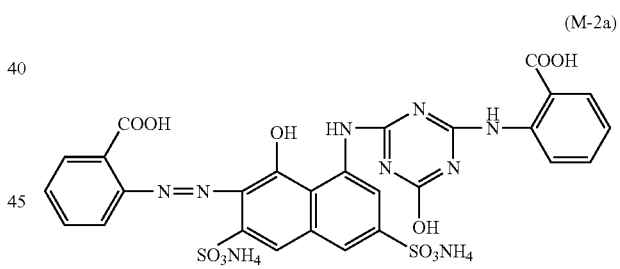

(M-2a)

The compound represented by the chemical formula (M-2a) is, in the general formula (M-2), in a state in which r is the number of 0, $R_8$ is a carboxyl group at the 2-position of a phenyl group bonded to an azo group, $R_9$, $R_{10}$, and $R_{12}$ are a hydrogen atom, $R_{11}$ is a 2-carboxyphenyl group, and $R_{13}$ is a hydrogen atom. In the compound represented by the chemical formula (M-2a), a sulfonic acid at the 3-position and the 6-position of a naphthalene ring is ammonium salt.

Examples of the magenta dye except for the dye (M-1) and the dye (M-2) include, without limitation, the direct dye such as C. I. Direct Red 4, 17, 28, 37, 63, 75, 79, 80, 81, 83, and 254; the acid dye such as C. I. Acid Red 1, 6, 8, 18, 32, 35, 37, 42, 52, 85, 88, 115, 133, 134, 154, 186, 249, 289, and 407; the basic dye such as C. I. Basic Red 9, 12, and 13; and the reactive dye such as C. I. Reactive Red 4, 23, 24, 31, and 56.

An example of the coloring agent used for the cyan ink (a cyan coloring agent) includes a cyan dye. An example of the cyan dye which is excellent in the ozone resistance is described in co-pending application no. U.S. 2007/0186808 A1, which is hereby incorporated by reference in its entirety. The cyan dye may be represented by the following general formula (C-1).

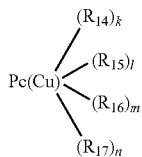
(C-1)

wherein, in the general formula (C-1), Pc(Cu) represents a copper phthalocyanine nucleus represented by the following general formula (Pc), $R_{14}$, $R_{15}$, $R_{16}$, and $R_{17}$ each independently represent a substituent selected from a group of —$SO_2R_a$, —$SO_2NR_bR_c$, and —$CO_2R_a$, provided that $R_{14}$, $R_{15}$, $R_{16}$, and $R_{17}$, are not simultaneously the same, that at least one of $R_{14}$, $R_{15}$, $R_{16}$, and $R_{17}$ has an ionic hydrophilic group as a substituent, and that at least one of $R_{14}$, $R_{15}$, $R_{16}$, and $R_{17}$ is present on each of four benzene rings A, B, C and D of the copper phthalocyanine nucleus represented by the following general formula (Pc), wherein $R_a$ represents an optionally substituted alkyl group; $R_b$ represents a hydrogen atom or an optionally substituted alkyl group; and $R_c$, represents an optionally substituted alkyl group; k is a number satisfying $0<k<8$; l is a number satisfying $0<l<8$; m is a number satisfying $0\leq m<8$; n is a number satisfying $0\leq n<8$; and k, l, m, and n are numbers satisfying $4\leq k+l+m+n\leq 8$.

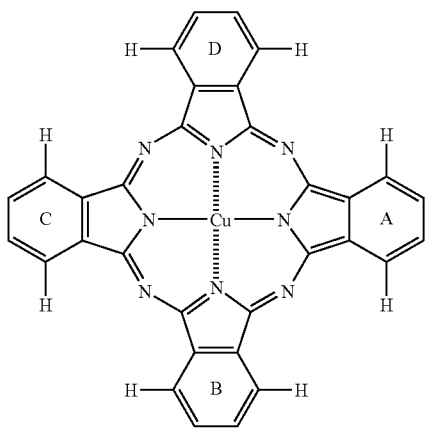
(Pc)

A specific example of the dye (C-1) includes compounds represented by the following chemical formulae (C-1a) and (C-1b).

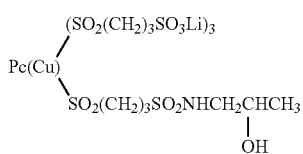
(C-1a)

The compound represented by the chemical formula (C-1a) is, in the general formula (C-1), in a state in which $R_{14}$ is a lithium sulfonato propylsulfonyl group, $R_{15}$ is an N-(2-hydroxypropyl) sulfamoylpropylsulfonyl group, k is the number of 3, l is the number of 1, m and n are the number of 0.

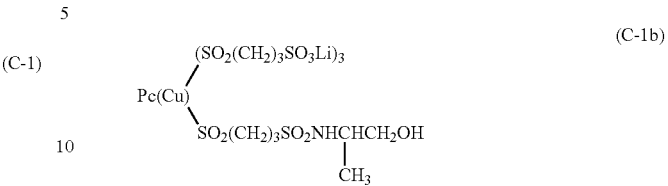
(C-1b)

The compound represented by the chemical formula (C-1b) is, in the general formula (C-1), in a state in which $R_{14}$ is a lithium sulfonato propylsulfonyl group, $R_{15}$ is an N-(2-hydroxyisopropyl) sulfamoylpropylsulfonyl group, k is the number of 3, l is the number of 1, m and n are the number of 0.

The cyan dye also may be represented by the following general formula (C-2).

(C-2)

wherein, in the general formula (C-2), Pc(Cu) represents the copper phthalocyanine nucleus represented by the general formula (Pc); s is the number satisfying $0<s<4$; t is the number satisfying $0<t<4$, wherein s and t are numbers satisfying $2\leq s+t\leq 5$; an $SO_3M$ group is present on any of four benzene rings A, B, C and D of the copper phthalocyanine nucleus represented by the general formula (Pc); an $SO_2NH_2$ group is present on any of four benzene rings A, B, C and D of the copper phthalocyanine nucleus represented by the general formula (Pc); and M represents a lithium ion, a sodium ion, a potassium ion, or an ammonium ion.

A specific example of the dye (C-2) includes compounds represented by the following chemical formulae (C-2a) and (C-2b).

(C-2a)

The compound represented by the chemical formula (C-2a) is, in the general formula (C-2), in a state in which M is a sodium ion, s is the number of 1, t is the number of 3, one of $SO_3Na$ group and three of $SO_2NH_2$ groups are respectively present on each of four benzene rings A, B, C and D of the copper phthalocyanine nucleus represented by the general formula (Pc).

(C-2b)

The compound represented by the chemical formula (C-2b) is, in the general formula (C-2), in a state in which M is a sodium ion, s and t are the number of 2, two of $SO_3Na$ groups and two of $SO_2NH_2$ groups are respectively present on each of four benzene rings A, B, C and D of the copper phthalocyanine nucleus represented by the general formula (Pc).

Examples of the cyan dye except for the dye (C-1) and the dye (C-2) include, without limitation, the direct dye such as C. I. Direct Blue 1, 6, 8, 15, 22, 25, 71, 76, 80, 86, 87, 90, 106, 108, 123, 163, 165, 199, and 226; the acid dye such as C. I. Acid Blue 9, 22, 29, 40, 59, 62, 93, 102, 104, 112, 113, 117, 120, 167, 175, 183, 229, and 234; the basic dye such as C. I. Basic Blue 1, 3, 5, 7, 9, 24, 25, 26, 28, and 29; and the reactive dye such as C. I. Reactive Blue 7, 13, and 49.

The yellow coloring agent, the magenta coloring agent, and the cyan coloring agent described above are mere examples. The yellow ink, the magenta ink, and the cyan ink are not limited to the aforementioned coloring agents and may be prepared by adding and suitably toning a plurality of the yellow coloring agent, the magenta coloring agent, and the cyan coloring agent.

With respect to the three colors of ink, an amount of the coloring agent relative to the total amount of the ink (a coloring agent ratio) is not limited. The coloring agent ratio may be determined suitably according to a characteristic of the desired ink, for example. The coloring agent ratio is usually in the range of about 0.1% by weight to about 10% by weight, and often in the range of about 0.2% by weight to about 6% by weight.

Water to be used for the three colors of ink is preferably ion-exchange water or purified water. An amount of the water relative to the total amount of the ink (a water ratio) may be determined suitably according to a composition of other components constructing the ink or a characteristic of the desired ink, for example. The water ratio is usually in the range of about 10% by weight to about 95% by weight, and often in the range of about 10% by weight to about 80% by weight. The water ratio may be a remnant of the other components, for example.

Water-soluble organic solvent to be used for the three colors of ink is classified into a humectant and a penetrant. The humectant prevents the ink-jet head from clogging, for example. The penetrant adjusts an infiltration rate of the ink to a recording paper, for example.

The humectant is not limited. An example of the humectant includes, without limitation, water-soluble glycol such as glycerin, ethylene glycol, diethylene glycol, polyethylene glycol, propylene glycol, dipropylene glycol, tripropylene glycol, polypropylene glycol, 1,5-pentanediol, 1,6-hexanediol, etc. An amount of the humectant relative to the total amount of the ink (a humectant ratio) is not limited. The humectant ratio is usually in the range of about 5% by weight to about 50% by weight, and often in the range of about 10% by weight to about 40% by weight.

The penetrant is not limited. Examples of the penetrant include ethylene glycol type alkyl ether, propylene glycol type alkyl ether, etc. Examples of the ethylene glycol type alkyl ether include, without limitation, ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether, etc. Examples of the propylene glycol type alkyl ether include, without limitation, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. An amount of the penetrant relative to the total amount of the ink (a penetrant ratio) is not limited. The penetrant ratio is usually in the range of about 0.1% by weight to about 10% by weight, and often in the range of about 0.5% by weight to about 7% by weight.

The three colors of ink may further comprise water-soluble organic solvent other than the humectant and the penetrant. The water-soluble organic solvent realizes a prevention of drying of ink at the tip of an ink-jet head, an improvement of a printing concentration, a vivid coloration, etc. Examples of the water-soluble organic solvent include, without limitation, lower alcohol, amide, ketone, ketoalcohol, ether, glycerin, pyrrolidone, 1,3-dimethyl-2-imidazolidinone, etc. Examples of the lower alcohol include, without limitation, methyl alcohol, ethyl alcohol, n-propyl alcohol, isopropyl alcohol, n-butyl alcohol, sec-butyl alcohol, tert-butyl alcohol, etc. Examples of the amide include, without limitation, dimethylformamide, dimethylacetamide, etc. Examples of the ketone include, without limitation, acetone, etc. Examples of the ketoalcohol include, without limitation, diacetone alcohol, etc. Examples of the ether include, without limitation, tetrahydrofuran, dioxane, etc. Examples of the pyrrolidone include, without limitation, 2-pyrrolidone, N-methyl-2-pyrrolidone, etc.

One of the water-soluble organic solvent may be used alone or two or more of the water-soluble organic solvents may be used in combination.

The three colors of ink may further comprise conventionally known additive, as required. Examples of the additive include, without limitation, a surfactant, a viscosity modifier, a surface tension modifier, a mildewproofing agent, a corrosion inhibitor, a pH adjuster, etc. The viscosity modifier includes, without limitation, polyvinyl alcohol, polyvinyl pyrrolidone, water-soluble resin, etc.

The three colors of ink may be prepared, for example, by uniformly mixing the coloring agent, water, and the water-soluble solvent with other added components as required by a conventionally known method, and then removing insoluble components, e.g., using a filter.

By comprising the three colors of ink, the ink set for ink-jet recording may support a full color recording. The ink set may be composed of the three colors of ink only, or may further comprise other color of ink. Examples of the other color of ink include, without limitation, a black ink, a red ink, a green ink, a blue ink, a light ink whose dye concentration is low (a light yellow ink, a light magenta ink, a light cyan ink, a light black ink, a light red ink, a light green ink, a light blue ink, etc.), etc.

The ink-jet recording apparatus may comprise a yellow ink storage portion, a magenta ink storage portion, and a cyan ink storage portion. The yellow ink is mounted to the yellow ink storage portion, the magenta ink is mounted to the magenta ink storage portion, and the cyan ink is mounted to the cyan ink storage portion. The construction of the ink-jet recording apparatus may otherwise be similar to a conventionally known ink-jet recording apparatus.

The ink-jet recording apparatus may further comprise a storage portion for ink(s) of other color(s). The storage portion for each ink includes an ink cartridge. The ink cartridge may be an all-in-one ink cartridge whose inside is divided for forming the storage portions for the ink of each color. Usually a separate ink cartridge is provided for each color. The body of the ink cartridge may otherwise be of conventional construction.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge device 8 as main constructional elements.

The four ink cartridges 2 comprise inks of yellow, magenta, cyan, and black. The ink-jet head 3 performs printing on a recording material P such as a recording paper. The head unit 4 is provided with the ink jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in the reset position. In this state, the pump 15 draws poor ink containing, for example, air bubbles trapped inside the ink-jet head 3, by being driven by the cam 16. Thereby a recovery of the ink-jet head is promoted. The drawn poor ink is stored in the ink reservoir 17.

A wiper member 20 is provided on the platen roller 7 side of the purge unit 8 while being adjacent to the purge unit 8. The wiper member 20 has a spatula shape, and wipes a nozzle surface of the ink-jet head 3 in accordance with the movement of the carriage 5. In FIG. 1, in order to prevent the ink from drying, the cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. Alternatively, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

A method of ink-jet recording comprises performing ink-jet recording with the ink set for ink-jet recording comprising the yellow ink, the magenta ink, and the cyan ink as previously described. When the ozone resistance evaluation test is carried out on the composite black patch formed on the glossy paper by the yellow ink, the magenta ink, and the cyan ink in the conditions of (I) to (IV), the method of ink-jet recording includes the "property 1." The method of ink-jet recording may be executed, for example, with the ink-jet recording apparatus by performing ink-jet recording with the ink set as described herein. Composite black images formed are less prone to exhibiting unnatural color formation over time.

A method of evaluating of the ink set for ink-jet recording comprising the yellow ink, the magenta ink, and the cyan ink comprises forming composite black patch on glossy paper by mixing or overstriking the yellow ink, the magenta ink, and the cyan ink. The composite black image may then be evaluated for ozone resistance in the conditions of (I) to (IV). An OD value reduction rate (%) may then be obtained among the yellow component, the magenta component, and the cyan component of the composite black patch. The method of evaluating may be executed, for example, with the ozone weather meter and the spectrophotometer by measuring the OD value of the yellow component, the magenta component, and the cyan component of the composite black patch before and after the ozone resistance evaluation test. Ink sets including the "property 1" may be judged as an ink set which is less prone to produce a composite black image that exhibits unnatural color formation over time.

A method of manufacturing the ink set for ink-jet recording comprises forming a composite black patch on glossy paper by mixing or overstriking the yellow ink, the magenta ink, and the cyan ink. The composite black image may then be evaluated for ozone resistance in the conditions of (I) to (IV). An OD value reduction rate (%) may then be obtained among the yellow component, the magenta component, and the cyan component of the composite black patch. The method of evaluating may be executed, for example, with the ozone weather meter and the spectrophotometer by measuring the OD value of the yellow component, the magenta component, and the cyan component of the composite black patch before and after the ozone resistance evaluation test. The method respectively represented by the chemical formulae (M-1a) and (M-1b) and the cyan dyes (C-1a), (C-1b), (C-2a), and (C-2b) are compounds respectively represented by the chemical formulae (C-1a), (C-1b), (C-2a), and (C-2b).

TABLE 1

|  | Example 1 | | | Example 2 | | |
| --- | --- | --- | --- | --- | --- | --- |
|  | Yellow | Magenta | Cyan | Yellow | Magenta | Cyan |
| Yellow |  |  |  |  |  |  |
| C.I. Direct Yellow 86 | 0.6 | — | — | 0.6 | — | — |
| C.I. Direct Yellow 132 | 2.0 | — | — | 2.0 | — | — |
| Magenta |  |  |  |  |  |  |
| Magenta dye (M-1a) | — | 3.2 | — | — | — | — |
| Magenta dye (M-1b) | — | — | — | — | 3.2 | — |
| Cyan |  |  |  |  |  |  |
| Cyan dye (C-1a) | — | — | 3.4 | — | — | — |
| Cyan dye (C-1b) | — | — | — | — | — | 3.4 |
| Cyan dye (C-2a) | — | — | 0.4 | — | — | — |
| Cyan dye (C-2b) | — | — | — | — | — | 0.4 |
| Glycerin | 23.0 | 23.0 | 23.0 | 23.0 | 23.0 | 23.0 |
| Diethyleneglycol | 6.0 | 6.0 | 6.0 | 6.0 | 6.0 | 6.0 |
| Triethylene glycol-n-butyl ether | 4.5 | 4.5 | 4.5 | 4.5 | 4.5 | 4.5 |
| Surfactant (1*) | 0.1 | 0.1 | 0.1 | 0.1 | 0.1 | 0.1 |
| Proxel GXL(S) (2*) | 0.2 | 0.2 | 0.2 | 0.2 | 0.2 | 0.2 |
| Water | Balance | Balance | Balance | Balance | Balance | Balance |

(unit: % by weight)
(1*) polyoxy lauryl (12, 13) ether sodium sulfate (ethylene oxide average addition mole number: 3)
(2*) dipropylene glycol aqueous solution containing 1,2-benzisothiazolin-3-one (20% by weight) manufactured by Arch Chemicals Japan, Inc.

manufacturing the ink set also comprises selecting a combination of yellow ink, magenta ink, and cyan ink such that a greatest difference of an OD value reduction rate (%) among the yellow component, the magenta component, and the cyan component of the composite black patch is 10 or less in each of (I) to (IV). According to the method of manufacturing the ink set, the ink set may be obtained which produces the image with a few unnatural color generating in the composite black.

Ink sets for ink-jet recording as described herein may exhibit one or more of "property 1," "property 2," "property 3,", "property 4," and "property 5," as previously defined.

EXAMPLES

Examples of the present invention are described together with Comparative Examples, which are provided for illustrative purposes only. The present invention is not limited by the following Examples and Comparative Examples.

Examples 1 to 3 and Comparative Examples 1 to 8

An ink composition component (Tables 1 to 6) was stirred and then mixed. Thereafter, the mixture was filtered with a hydrophilic polytetrafluoroethylene (PTFE) type membrane filter having a pore diameter of 0.2 μm manufactured by ToyoRoshi Kaisha, Ltd. to produce each ink and thereby obtained the ink set for ink-jet recording of Examples 1 to 3 and Comparative Examples 1 to 8. In the following Tables 1 to 6, the magenta dyes (M-1a) and (M-1b) are compounds

TABLE 2

|  | Example 3 | | |
| --- | --- | --- | --- |
|  | Yellow | Magenta | Cyan |
| Yellow |  |  |  |
| C.I. Direct Yellow 86 | 0.5 | — | — |
| C.I. Direct Yellow 132 | 1.6 | — | — |
| C.I. Acid Yellow 23 | 0.2 | — | — |
| Magenta |  |  |  |
| Magenta dye (M-1b) | — | 3.2 | — |
| Cyan |  |  |  |
| Cyan dye (C-1b) | — | — | 3.4 |
| Cyan dye (C-2b) | — | — | 0.4 |
| Glycerin | 23.0 | 23.0 | 23.0 |
| Diethyleneglycol | 6.0 | 6.0 | 6.0 |
| Triethylene glycol-n-butyl ether | 4.5 | 4.5 | 4.5 |
| Surfactant (1*) | 0.1 | 0.1 | 0.1 |
| Proxel GXL(S) (2*) | 0.2 | 0.2 | 0.2 |
| Water | Balance | Balance | Balance |

(unit: % by weight)
(1*) polyoxy lauryl (12, 13) ether sodium sulfate (ethylene oxide average addition mole number: 3)
(2*) dipropylene glycol aqueous solution containing 1,2-benzisothiazolin-3-one (20% by weight) manufactured by Arch Chemicals Japan, Inc.

TABLE 3

|  | Comparative Example 1 | | | Comparative Example 2 | | |
| --- | --- | --- | --- | --- | --- | --- |
|  | Yellow | Magenta | Cyan | Yellow | Magenta | Cyan |
| Yellow | | | | | | |
| C.I. Direct Yellow 86 | 0.6 | — | — | 0.6 | — | — |
| C.I. Direct Yellow 132 | 2.0 | — | — | 2.0 | — | — |
| Magenta | | | | | | |
| Magenta dye (M-2a) | — | 3.0 | — | — | — | — |
| C.I. Acid Red 289 | — | — | — | — | 1.0 | — |
| Cyan | | | | | | |
| C.I. Direct Blue 199 | — | — | 2.9 | — | — | 2.9 |
| Glycerin | 23.0 | 23.0 | 23.0 | 23.0 | 23.0 | 23.0 |
| Diethyleneglycol | 6.0 | 6.0 | 6.0 | 6.0 | 6.0 | 6.0 |
| Triethylene glycol-n-butyl ether | 4.5 | 4.5 | 4.5 | 4.5 | 4.5 | 4.5 |
| Sulfactant (1*) | 0.1 | 0.1 | 0.1 | 0.1 | 0.1 | 0.1 |
| Proxel GXL(S) (2*) | 0.2 | 0.2 | 0.2 | 0.2 | 0.2 | 0.2 |
| Water | Balance | Balance | Balance | Balance | Balance | Balance |

(unit: % by weight)

(1*) polyoxy lauryl (12, 13) ether sodium sulfate (ethylene oxide average addition mole number: 3)

(2*) dipropylene glycol aqueous solution containing 1,2-benzisothiazolin-3-one (20% by weight) manufactured by Arch Chemicals Japan, Inc.

TABLE 4

|  | Comparative Example 3 | | | Comparative Example 4 | | |
| --- | --- | --- | --- | --- | --- | --- |
|  | Yellow | Magenta | Cyan | Yellow | Magenta | Cyan |
| Yellow | | | | | | |
| C.I. Direct Yellow 86 | — | — | — | 0.5 | — | — |
| C.I. Direct Yellow 132 | — | — | — | 1.6 | — | — |
| C.I. Acid Yellow 23 | 1.2 | — | — | 0.2 | — | — |
| Magenta | | | | | | |
| Magenta dye (M-1b) | — | 3.2 | — | — | — | — |
| Magenta dye (M-2a) | — | — | — | — | 3.0 | — |
| Cyan | | | | | | |
| Cyan dye (C-1a) | — | — | 3.4 | — | — | — |
| Cyan dye (C-2a) | — | — | 0.4 | — | — | — |
| C.I. Direct Blue 199 | — | — | — | — | — | 2.9 |
| Glycerin | 23.0 | 23.0 | 23.0 | 23.0 | 23.0 | 23.0 |
| Diethyleneglycol | 6.0 | 6.0 | 6.0 | 6.0 | 6.0 | 6.0 |
| Triethylene glycol-n-butyl ether | 4.5 | 4.5 | 4.5 | 4.5 | 4.5 | 4.5 |
| Sulfactant (1*) | 0.1 | 0.1 | 0.1 | 0.1 | 0.1 | 0.1 |
| Proxel GXL(S) (2*) | 0.2 | 0.2 | 0.2 | 0.2 | 0.2 | 0.2 |
| Water | Balance | Balance | Balance | Balance | Balance | Balance |

(unit: % by weight)

(1*) polyoxy lauryl (12, 13) ether sodium sulfate (ethylene oxide average addition mole number: 3)

(2*) dipropylene glycol aqueous solution containing 1,2-benzisothiazolin-3-one (20% by weight) manufactured by Arch Chemicals Japan, Inc.

TABLE 5

|  | Comparative Example 5 | | | Comparative Example 6 | | |
| --- | --- | --- | --- | --- | --- | --- |
|  | Yellow | Magenta | Cyan | Yellow | Magenta | Cyan |
| Yellow | | | | | | |
| C.I. Acid Yellow 23 | 1.2 | — | — | 1.2 | — | — |
| Magenta | | | | | | |
| Magenta dye (M-1a) | — | 3.2 | — | — | — | — |
| Magenta dye (M-2a) | — | — | — | — | 3.0 | — |
| Cyan | | | | | | |
| Cyan dye (C-1a) | — | — | — | — | — | 3.4 |
| Cyan dye (C-2a) | — | — | — | — | — | 0.4 |
| C.I. Direct Blue 199 | — | — | 2.9 | — | — | — |
| Glycerin | 23.0 | 23.0 | 23.0 | 23.0 | 23.0 | 23.0 |
| Diethyleneglycol | 6.0 | 6.0 | 6.0 | 6.0 | 6.0 | 6.0 |
| Triethylene glycol-n-butyl ether | 4.5 | 4.5 | 4.5 | 4.5 | 4.5 | 4.5 |
| Sulfactant (1*) | 0.1 | 0.1 | 0.1 | 0.1 | 0.1 | 0.1 |
| Proxel GXL(S) (2*) | 0.2 | 0.2 | 0.2 | 0.2 | 0.2 | 0.2 |
| Water | Balance | Balance | Balance | Balance | Balance | Balance |

(unit: % by weight)
(1*) polyoxy lauryl (12, 13) ether sodium sulfate (ethylene oxide average addition mole number: 3)
(2*) dipropylene glycol aqueous solution containing 1,2-benzisothiazolin-3-one (20% by weight) manufactured by Arch Chemicals Japan, Inc.

TABLE 6

|  | Comparative Example 7 | | | Comparative Example 8 | | |
| --- | --- | --- | --- | --- | --- | --- |
|  | Yellow | Magenta | Cyan | Yellow | Magenta | Cyan |
| Yellow | | | | | | |
| C.I. Direct Yellow 86 | 0.6 | — | — | 0.5 | — | — |
| C.I. Direct Yellow 132 | 2.0 | — | — | 1.6 | — | — |
| C.I. Acid Yellow 23 | — | — | — | 0.2 | — | — |
| Magenta | | | | | | |
| Magenta dye (M-1a) | — | 3.2 | — | — | 1.3 | — |
| Magenta dye (M-2a) | — | — | — | — | 1.8 | — |
| Cyan | | | | | | |
| Cyan dye (C-1a) | — | — | 1.4 | — | — | 3.4 |
| Cyan dye (C-2a) | — | — | 0.2 | — | — | 0.4 |
| C.I. Direct Blue 199 | — | — | 1.7 | — | — | — |
| Glycerin | 23.0 | 23.0 | 23.0 | 23.0 | 23.0 | 23.0 |
| Diethyleneglycol | 6.0 | 6.0 | 6.0 | 6.0 | 6.0 | 6.0 |
| Triethylene glycol-n-butyl ether | 4.5 | 4.5 | 4.5 | 4.5 | 4.5 | 4.5 |
| Sulfactant (1*) | 0.1 | 0.1 | 0.1 | 0.1 | 0.1 | 0.1 |
| Proxel GXL(S) (2*) | 0.2 | 0.2 | 0.2 | 0.2 | 0.2 | 0.2 |
| Water | Balance | Balance | Balance | Balance | Balance | Balance |

(unit: % by weight)
(1*) polyoxy lauryl (12, 13) ether sodium sulfate (ethylene oxide average addition mole number: 3)
(2*) dipropylene glycol aqueous solution containing 1,2-benzisothiazolin-3-one (20% by weight) manufactured by Arch Chemicals Japan, Inc.

Evaluation

The ozone resistance evaluation test was carried out on each ink set of Examples and Comparative Examples. Specific method of the test is as follows.

(1) Formation of Composite Black Patch

The ink cartridges were respectively filled up with the yellow ink, the magenta ink, and the cyan ink. Next, the three ink cartridges are attached to an ink-jet printer mounted digital multi-function center DCP-110C (trade name) manufactured by Brother Industries, Ltd. Then, a gradation sample of the composite black was printed on a premium glossy photo paper for color ink-jet recording manufactured by Oji Paper Co., Ltd., and thereby obtained a composite black patch having an initial OD value of about 1.0. With respect to the composite black, $V_Y:V_M:V_C$ is 1:1 to 1.1:1 to 1.3. The OD value was measured by a spectrophotometer, Spectrolino (trade name, light source: $D_{65}$; view angle: 2°; and status A), manufactured by Gretag-Macbeth.

(2) Formation of Mono-Color Yellow Patch, Mono-Color Magenta Patch, and Mono-Color Cyan Patch The ink cartridge was filled up with the yellow ink. Next, the ink cartridge was attached to the ink-jet printer mounted digital multi-function center DCP-110C (trade name) manufactured by Brother Industries, Ltd. Then, a gradation sample of the mono-color yellow ink was printed on the premium glossy photo paper for color ink-jet recording manufactured by Oji Paper Co., Ltd., and thereby obtained a mono-color yellow patch having an initial OD value of about 1.0. The OD value was measured by a spectrophotometer, Spectrolino (trade name, light source: $D_{65}$; view angle: 2°; and status A), manufactured by Gretag-Macbeth. With respect to the magenta ink and the cyan ink, the mono-color magenta patch and the mono-color cyan patch each having the initial OD value of about 1.0 were obtained by the same manner as the yellow ink.

(3) Ozone Resistance Evaluation Test

The ozone resistance evaluation test was carried out with the ozone weather meter, OMS-H (trade name), manufactured by SUGA TEST INSTRUMENTS CO., LTD. in the following conditions of (I) to (IV).

(I) temperature: 20° C., relative humidity: 45% ozone concentration: 2 ppm, time: 7 hours (II) temperature: 20° C., relative humidity: 70% ozone concentration: 2 ppm, time: 7 hours (III) temperature: 30° C., relative humidity: 45% ozone concentration: 2 ppm, time: 7 hours (IV) temperature: 30° C., relative humidity: 70% ozone concentration: 2 ppm, time: 7 hours (3-1) OD Value Evaluation of Composite Black Patch (Evaluations 1 and 2)

OD value of the yellow component, the magenta component, and the cyan component of the composite black patch after the ozone resistance evaluation test was measured. The OD value was measured by a spectrophotometer, Spectrolino (trade name, light source: $D_{65}$; view angle: 2°; and status A), manufactured by Gretag-Macbeth. The OD value reduction rate (%) of the yellow component, the magenta component, and the cyan component of the composite black patch was obtained with the following formulae. On the basis of the OD value reduction rate (%), it was judged whether the following "property 1" was included in each condition of (I) to (IV) and evaluated according to the following Evaluation Criteria 1. Further, it was judged whether the following "property 2" was included in the yellow component, the magenta component, and the cyan component and evaluated according to the following Evaluation Criteria 2.

$$A_y = ((OD_{y0} - OD_{y1})/OD_{y0}) \times 100$$

$$A_m = ((OD_{m0} - OD_{m1})/OD_{m0}) \times 100$$

$$A_c = ((OD_{c0} - OD_{c1})/OD_{c0}) \times 100$$

$A_y$: OD value reduction rate (%) of yellow component $A_m$: OD value reduction rate (%) of magenta component $A_c$: OD value reduction rate (%) of cyan component $OD_{y0}$: OD value of yellow component in composite black patch before ozone resistance evaluation test $OD_{y1}$: OD value of yellow component in composite black patch after ozone resistance evaluation test $OD_{m0}$: OD value of magenta component in composite black patch before ozone resistance evaluation test $OD_{m1}$: OD value of magenta component in composite black patch after ozone resistance evaluation test $OD_{c0}$: OD value of cyan component in composite black patch before ozone resistance evaluation test $OD_{c1}$: OD value of cyan component in composite black patch after ozone resistance evaluation test Evaluation Criteria 1

G: The following "property 1" was included.

NG: the following "property 1" was not included.

<Property 1>

The greatest difference of the OD value reduction rate (%) among the yellow component, the magenta component, and the cyan component of the composite black patch is 10 or less in each of conditions of (I) to (IV).

Evaluation Criteria 2

G: The following "property 2" was included.

NG: The following "property 2" was not included.

<Property 2>

The greatest difference of the OD value reduction rate (%) among conditions of (I) to (IV) is 10 or less in each of the yellow component, the magenta component, and the cyan component.

(3-2) Visual Evaluation of Composite Black Patch (Evaluation 3)

The composite black patch after the ozone resistance evaluation test was visually observed. The black color observed by the visual observation was evaluated according to the following Evaluation Criteria 3.

Evaluation Criteria 3

G: It could be seen as a well-balanced black color in all conditions of (I) to (IV).

NG: It could not be seen as the black color in at least one of the conditions of (I) to (IV).

(3-3) OD Value Evaluation of Mono-Color Yellow Patch, Mono-Color Magenta Patch, and Mono-Color Cyan Patch (Evaluations 4 and 5)

OD value of the mono-color yellow patch, the mono-color magenta patch, and the mono-color cyan patch after the ozone resistance evaluation test was measured. The OD value was measured by a spectrophotometer, Spectrolino (trade name, light source: $D_{65}$; view angle: 2°; and status A), manufactured by Gretag-Macbeth. The OD value reduction rate (%) of the mono-color yellow patch, the mono-color magenta patch, and the mono-color cyan patch was obtained with the following formulae. On the basis of the OD value reduction rate (%), it was judged whether the following "property 3" was included in each condition of (I) to (IV) and evaluated according to the following Evaluation Criteria 4. Further, it was judged whether the following "property 5" was included in the mono-color yellow patch, the mono-color magenta patch, and the mono-color cyan patch and evaluated according to the following Evaluation Criteria 5.

$$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$B_Y$: OD value reduction rate (%) of mono-color yellow patch $B_M$: OD value reduction rate (%) of mono-color magenta patch $B_C$: OD value reduction rate (%) of mono-color cyan patch $OD_{Y0}$: OD value of mono-color yellow patch before ozone resistance evaluation test $OD_{Y1}$: OD value of mono-color yellow patch after ozone resistance evaluation test $OD_{M0}$: OD value of mono-color magenta patch before ozone resistance evaluation test $OD_{M1}$: OD value of mono-color magenta patch after ozone resistance evaluation test $OD_{C0}$: OD value of mono-color cyan patch before ozone resistance evaluation test $OD_{C1}$: OD value of mono-color cyan patch after ozone resistance evaluation test Evaluation Criteria 4

G: The following "property 3" was included in all conditions of (I) to (IV).

NG: The following "property 3" was not included in at least one of the conditions of (I) to (IV).

<Property 3>
(a) $-10 \leq B_Y - B_M \leq 20$
(b) $-10 \leq B_Y - B_C \leq 20$
(c) $-10 \leq B_M - B_C \leq 15$ Evaluation Criteria 5

G: The following "property 5" was included in all of the mono-color yellow patch, the mono-color magenta patch, and the mono-color cyan patch.

NG: The following "property 5" was not included in at least one of the mono-color yellow patch, the mono-color magenta patch, and the mono-color cyan patch.

<Property 5>

The greatest difference of the OD value reduction rate (%) among conditions of (I) to (IV) in each of the mono-color yellow patch, the mono-color magenta patch, and the mono-color cyan patch is 20 or less.

The OD value reduction rate (%) of the yellow component, the magenta component, and the cyan component of the composite black patch of Examples 1 to 3 and Comparative Examples 1 to 8, the greatest difference of the OD value reduction rate (%) among the yellow component, the magenta component, and the cyan component in each of condition of (I) to (IV) and the evaluation results thereof (Evaluation 1), the greatest difference of the OD value reduction rate (%) among conditions of (I) to (IV) in each of the yellow component, the magenta component, and the cyan component and the evaluation results thereof (Evaluation 2), and the evaluation results of the visual evaluation of the composite black patch (Evaluation 3) are summarized in the following Tables 7 to 17.

TABLE 7

| Example 1 | OD Value Reduction Rate (%) | | | Greatest Difference of OD Value Reduction Rate (%) |
|---|---|---|---|---|
| | Yellow Component | Magenta Component | Cyan Component | |
| Condition (I) | 6 | 7 | 3 | 4 |
| Condition (II) | 3 | 5 | 6 | 3 |
| Condition (III) | 9 | 8 | 5 | 4 |
| Condition (IV) | 9 | 10 | 7 | 3 |
| Greatest Difference of OD Value Reduction Rate (%) | 6 | 5 | 4 | — |
| Evaluation 1 | | — | | G |
| Evaluation 2 | | G | | — |
| Evaluation 3 | | — | | G |

TABLE 8

| Example 2 | OD Value Reduction Rate (%) | | | Greatest Difference of OD Value Reduction Rate (%) |
|---|---|---|---|---|
| | Yellow Component | Magenta Component | Cyan Component | |
| Condition (I) | 5 | 7 | 2 | 5 |
| Condition (II) | 3 | 6 | 5 | 3 |
| Condition (III) | 9 | 9 | 5 | 4 |
| Condition (IV) | 10 | 13 | 8 | 5 |
| Greatest Difference of OD Value Reduction Rate (%) | 7 | 7 | 6 | — |
| Evaluation 1 | | — | | G |
| Evaluation 2 | | G | | — |
| Evaluation 3 | | — | | G |

TABLE 9

| Example 3 | OD Value Reduction Rate (%) | | | Greatest Difference of OD Value Reduction Rate (%) |
|---|---|---|---|---|
| | Yellow Component | Magenta Component | Cyan Component | |
| Condition (I) | 11 | 8 | 3 | 8 |
| Condition (II) | 9 | 7 | 6 | 3 |
| Condition (III) | 13 | 10 | 6 | 7 |

TABLE 9-continued

| Example 3 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (IV) | 13 | 12 | 9 | 4 |
| Greatest Difference of OD Value Reduction Rate (%) | 4 | 5 | 6 | — |
| Evaluation 1 | | | — | G |
| Evaluation 2 | | G | | — |
| Evaluation 3 | | — | | G |

TABLE 10

| Comparative Example 1 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 15 | 47 | 45 | 32 |
| Condition (II) | 20 | 60 | 58 | 40 |
| Condition (III) | 19 | 52 | 45 | 33 |
| Condition (IV) | 26 | 69 | 66 | 43 |
| Greatest Difference of OD Value Reduction Rate (%) | 11 | 22 | 21 | — |
| Evaluation 1 | | | — | NG |
| Evaluation 2 | | NG | | — |
| Evaluation 3 | | — | | NG |

TABLE 11

| Comparative Example 2 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 14 | 49 | 41 | 35 |
| Condition (II) | 21 | 65 | 53 | 44 |
| Condition (III) | 18 | 56 | 42 | 38 |
| Condition (IV) | 28 | 71 | 64 | 43 |
| Greatest Difference of OD Value Reduction Rate (%) | 14 | 22 | 23 | — |
| Evaluation 1 | | | — | NG |
| Evaluation 2 | | NG | | — |
| Evaluation 3 | | — | | NG |

TABLE 12

| Comparative Example 3 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 46 | 10 | 4 | 42 |
| Condition (II) | 46 | 8 | 8 | 38 |
| Condition (III) | 45 | 11 | 8 | 37 |
| Condition (IV) | 58 | 16 | 11 | 47 |
| Greatest Difference of OD Value Reduction Rate (%) | 13 | 8 | 7 | — |
| Evaluation 1 | | | — | NG |
| Evaluation 2 | | NG | | — |
| Evaluation 3 | | — | | NG |

TABLE 13

| Comparative Example 4 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 35 | 50 | 48 | 15 |
| Condition (II) | 40 | 65 | 63 | 25 |
| Condition (III) | 38 | 55 | 48 | 17 |
| Condition (IV) | 48 | 74 | 69 | 26 |
| Greatest Difference of OD Value Reduction Rate (%) | 13 | 24 | 21 | — |
| Evaluation 1 | | — | | NG |
| Evaluation 2 | | NG | | — |
| Evaluation 3 | | — | | NG |

TABLE 14

| Comparative Example 5 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 61 | 15 | 36 | 46 |
| Condition (II) | 60 | 13 | 53 | 47 |
| Condition (III) | 62 | 16 | 40 | 46 |
| Condition (IV) | 68 | 21 | 55 | 47 |
| Greatest Difference of OD Value Reduction Rate (%) | 8 | 8 | 19 | — |
| Evaluation 1 | | — | | NG |
| Evaluation 2 | | NG | | — |
| Evaluation 3 | | — | | NG |

TABLE 15

| Comparative Example 6 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 65 | 42 | 6 | 59 |
| Condition (II) | 65 | 60 | 10 | 55 |
| Condition (III) | 67 | 50 | 11 | 56 |
| Condition (IV) | 73 | 68 | 13 | 60 |
| Greatest Difference of OD Value Reduction Rate (%) | 8 | 26 | 7 | — |
| Evaluation 1 | | — | | NG |
| Evaluation 2 | | NG | | — |
| Evaluation 3 | | — | | NG |

TABLE 16

| Comparative Example 7 | OD Value Reduction Rate (%) | | | Greatest Difference of OD Value Reduction Rate (%) |
| --- | --- | --- | --- | --- |
| | Yellow Component | Magenta Component | Cyan Component | |
| Condition (I) | 7 | 8 | 21 | 14 |
| Condition (II) | 6 | 6 | 33 | 27 |
| Condition (III) | 10 | 9 | 24 | 15 |
| Condition (IV) | 9 | 11 | 43 | 34 |
| Greatest Difference of OD Value Reduction Rate (%) | 4 | 5 | 22 | — |
| Evaluation 1 | | — | | NG |
| Evaluation 2 | | NG | | — |
| Evaluation 3 | | — | | NG |

TABLE 17

| Comparative Example 8 | OD Value Reduction Rate (%) | | | Greatest Difference of OD Value Reduction Rate (%) |
|---|---|---|---|---|
| | Yellow Component | Magenta Component | Cyan Component | |
| Condition (I) | 17 | 21 | 3 | <u>18</u> |
| Condition (II) | 13 | 30 | 5 | <u>25</u> |
| Condition (III) | 20 | 27 | 6 | <u>21</u> |
| Condition (IV) | 18 | 39 | 7 | <u>32</u> |
| Greatest Difference of OD Value Reduction Rate (%) | 7 | <u>18</u> | 4 | — |
| Evaluation 1 | | — | | NG |
| Evaluation 2 | | NG | | — |
| Evaluation 3 | | — | | NG |

The OD value reduction rate (%) of the mono-color yellow patch, the mono-color magenta patch, and the mono-color cyan patch of Examples 1 to 3 and Comparative Examples 1 to 8, the difference of the OD value reduction rate (%) between the mono-color yellow patch and the mono-color magenta patch (Y-M), the mono-color yellow patch and the mono-color cyan patch (Y-C), and the mono-color magenta patch and the mono-color cyan patch (M-C) in each condition of (I) to (IV) and the evaluation results thereof (Evaluation 4), and the greatest difference of the OD value reduction rate (%) among conditions of (I) to (IV) in each of the mono-color yellow patch, the mono-color magenta patch, and the mono-color cyan patch and the evaluation results thereof (Evaluation 5) are summarized in the following Tables 18 to 28.

TABLE 18

| Example 1 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 8 | 9 | 4 | −1 | 4 | 5 |
| Condition (II) | 2 | 2 | 6 | 0 | −4 | −4 |
| Condition (III) | 11 | 9 | 6 | 2 | 5 | 3 |
| Condition (IV) | 9 | 11 | 9 | −2 | 0 | 2 |
| Greatest Difference of OD Value Reduction Rate (%) | 9 | 9 | 5 | — | — | — |
| Evaluation 4 | | — | | | G | |
| Evaluation 5 | | G | | | — | |

TABLE 19

| Example 2 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 7 | 9 | 4 | −2 | 3 | 5 |
| Condition (II) | 1 | −1 | 6 | 2 | −5 | −7 |
| Condition (III) | 11 | 12 | 6 | −1 | 5 | 6 |
| Condition (IV) | 10 | 13 | 10 | −3 | 0 | 3 |
| Greatest Difference of OD Value Reduction Rate (%) | 10 | 14 | 6 | — | — | — |
| Evaluation 4 | | — | | | G | |
| Evaluation 5 | | G | | | — | |

TABLE 20

| Example 3 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 21 | 9 | 4 | 12 | 17 | 5 |
| Condition (II) | 19 | 0 | 6 | 19 | 13 | −6 |
| Condition (III) | 25 | 12 | 6 | 13 | 19 | 6 |
| Condition (IV) | 25 | 13 | 10 | 12 | 15 | 3 |
| Greatest Difference of OD Value Reduction Rate (%) | 6 | 13 | 6 | — | — | — |
| Evaluation 4 | | — | | | G | |
| Evaluation 5 | | G | | | — | |

TABLE 21

| Comparative Example 1 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 6 | 47 | 37 | <u>−41</u> | <u>−31</u> | 10 |
| Condition (II) | 2 | 61 | 53 | <u>−59</u> | <u>−51</u> | 8 |
| Condition (III) | 10 | 53 | 40 | <u>−43</u> | <u>−30</u> | 13 |
| Condition (IV) | 10 | 72 | 62 | <u>−62</u> | <u>−52</u> | 10 |
| Greatest Difference of OD Value Reduction Rate (%) | 8 | <u>25</u> | <u>25</u> | — | — | — |
| Evaluation 4 | | — | | | NG | |
| Evaluation 5 | | NG | | | — | |

TABLE 22

| Comparative Example 2 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 6 | 45 | 36 | <u>−39</u> | <u>−30</u> | 9 |
| Condition (II) | 2 | 66 | 57 | <u>−64</u> | <u>−55</u> | 9 |
| Condition (III) | 11 | 53 | 40 | <u>−42</u> | <u>−29</u> | 13 |
| Condition (IV) | 10 | 74 | 64 | <u>−64</u> | <u>−54</u> | 10 |
| Greatest Difference of OD Value Reduction Rate (%) | 9 | <u>29</u> | <u>28</u> | — | — | — |
| Evaluation 4 | | — | | | NG | |
| Evaluation 5 | | NG | | | — | |

TABLE 23

| Comparative Example 3 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 84 | 9 | 4 | <u>75</u> | <u>80</u> | 5 |
| Condition (II) | 73 | −2 | 6 | <u>75</u> | <u>67</u> | −8 |
| Condition (III) | 91 | 10 | 7 | <u>81</u> | <u>84</u> | 3 |
| Condition (IV) | 92 | 11 | 9 | <u>81</u> | <u>83</u> | 2 |
| Greatest Difference of OD Value Reduction Rate (%) | 19 | 13 | 5 | — | — | — |
| Evaluation 4 | | — | | | NG | |
| Evaluation 5 | | G | | | — | |

TABLE 24

| Comparative Example 4 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 21 | 47 | 37 | <u>−26</u> | <u>−16</u> | 10 |
| Condition (II) | 17 | 61 | 52 | <u>−44</u> | <u>−35</u> | 9 |
| Condition (III) | 26 | 53 | 41 | <u>−27</u> | <u>−15</u> | 12 |
| Condition (IV) | 25 | 72 | 61 | <u>−47</u> | <u>−36</u> | 11 |
| Greatest Difference of OD Value Reduction Rate (%) | 9 | <u>25</u> | <u>24</u> | — | — | — |
| Evaluation 4 | | — | | | NG | |
| Evaluation 5 | | NG | | | — | |

TABLE 25

| Comparative Example 5 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 85 | 9 | 36 | <u>76</u> | <u>49</u> | <u>−27</u> |
| Condition (II) | 74 | 2 | 53 | <u>72</u> | <u>21</u> | <u>−51</u> |
| Condition (III) | 90 | 12 | 40 | <u>78</u> | <u>50</u> | <u>−28</u> |
| Condition (IV) | 91 | 13 | 60 | <u>78</u> | <u>31</u> | <u>−47</u> |
| Greatest Difference of OD Value Reduction Rate (%) | 17 | 11 | <u>24</u> | — | — | — |
| Evaluation 4 | | — | | | NG | |
| Evaluation 5 | | NG | | | — | |

TABLE 26

| Comparative Example 6 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 84 | 44 | 5 | <u>40</u> | <u>79</u> | <u>39</u> |
| Condition (II) | 73 | 63 | 7 | 10 | <u>66</u> | <u>56</u> |
| Condition (III) | 91 | 52 | 6 | <u>39</u> | <u>85</u> | <u>46</u> |
| Condition (IV) | 92 | 72 | 9 | 20 | <u>83</u> | <u>63</u> |
| Greatest Difference of OD Value Reduction Rate (%) | 19 | <u>28</u> | 4 | — | — | — |
| Evaluation 4 | | — | | | NG | |
| Evaluation 5 | | NG | | | — | |

TABLE 27

| Comparative Example 7 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 8 | 9 | 23 | −1 | <u>−15</u> | <u>−14</u> |
| Condition (II) | 5 | 5 | 36 | 0 | <u>−31</u> | <u>−31</u> |
| Condition (III) | 11 | 9 | 24 | 2 | <u>−13</u> | <u>−15</u> |
| Condition (IV) | 9 | 10 | 46 | −1 | <u>−37</u> | <u>−36</u> |
| Greatest Difference of OD Value Reduction Rate (%) | 6 | 5 | <u>23</u> | — | — | — |
| Evaluation 4 | | — | | | NG | |
| Evaluation 5 | | NG | | | — | |

TABLE 28

| Comparative Example 8 | OD Value Reduction Rate (%) | | | Difference of OD Value Reduction Rate (%) | | |
|---|---|---|---|---|---|---|
| | Yellow | Magenta | Cyan | Y – M | Y – C | M – C |
| Condition (I) | 23 | 20 | 4 | 3 | 19 | <u>16</u> |
| Condition (II) | 17 | 31 | 6 | <u>−14</u> | 11 | <u>25</u> |
| Condition (III) | 26 | 26 | 6 | 0 | 20 | <u>20</u> |
| Condition (IV) | 24 | 44 | 9 | <u>−20</u> | 15 | <u>35</u> |
| Greatest Difference of OD Value Reduction Rate (%) | 9 | <u>24</u> | 5 | — | — | — |
| Evaluation 4 | | — | | | NG | |
| Evaluation 5 | | NG | | | — | |

The ink set of Examples 1 to 3 include "property 1" as summarized in Tables 7 to 9. Further, as a result of Evaluation 3, the composite black patch after the ozone resistance evaluation test could be seen as the well-balanced black color. Moreover, the ink set of Examples 1 to 3 include "property 2". On the other hand, the ink set of Comparative Examples 1 to 8 do not include "property 1" as summarized in Tables 10 to 17. Further, as a result of Evaluation 3, the composite black patch after the ozone resistance evaluation test could not be seen as the black color. Moreover, the ink set of Comparative Examples 1 to 8 do not include "property 2".

The ink set of Examples 1 to 3 include "property 3" in all conditions of (I) to (IV) as summarized in Tables 18 to 20 and the change in the color balance of the image was small. Further, the ink set of Examples 1 to 3 include "property 5" in all of the mono-color yellow patch, the mono-color magenta patch, and the mono-color cyan patch. On the other hand, the ink set of Comparative Examples 1 to 8 do not include "property 3" in at least one of the conditions of (I) to (IV) as summarized in Tables 21-28 and the change in the color balance of the image was large. Further, the ink set of Comparative Examples 1 to 8, except for Comparative Example 3, do not include "property 5" in at least one of the mono-color yellow patch, the mono-color magenta patch, and the mono-color cyan patch.

It will be obvious to those having skill in the art that many changes may be made in the above-described details of the particular aspects described herein without departing from the spirit or scope of the invention as defined in the appended claims.

What is claimed is:

1. An ink set for ink-jet recording comprising a yellow ink, a magenta ink, and a cyan ink for forming a composite black image by mixing or overstriking the yellow ink, the magenta ink, and the cyan ink, which composite black image is less prone to developing color over time, wherein a greatest difference of an OD value reduction rate (%) among a yellow component, a magenta component, and a cyan component of a composite black patch is 10 or less in each of conditions of (I) to (IV) when an ozone resistance evaluation test is carried out on the composite black patch formed on a glossy paper by the yellow ink, the magenta ink, and the cyan ink in following conditions of (I) to (IV), (I) temperature: about 20° C., relative humidity: about 45% ozone concentration: about 2 ppm, time: about 7 hours (II) temperature: about 20° C., relative humidity: about 70% ozone concentration: about 2 ppm, time: about 7 hours (III) temperature: about 30° C., relative humidity: about 45% ozone concentration: about 2 ppm, time: about 7 hours (IV) temperature: about 30° C., relative humidity: about 70% ozone concentration: about 2 ppm, time: about 7 hours wherein the magenta ink comprises a magenta dye represented by the following general formula (M-1) and the cyan ink comprises at least one of a cyan dye represented by the following general formula (C-1) and a cyan dye represented by the following general formula (C-2):

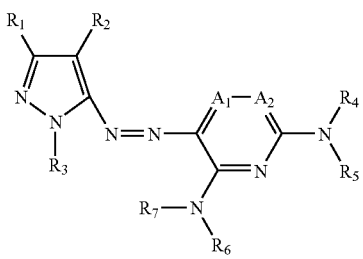

(M-1)

wherein the general formula (M-1), $R_1$ represents a hydrogen atom, an optionally substituted alkyl group, or an optionally substituted aryl group;

$R_2$ represents a hydrogen atom, a halogen atom, or a cyano group; $R_3$ represents a hydrogen atom, an optionally substituted alkyl group, an optionally substituted aryl group, or an optionally substituted heterocyclic group;

$R_4$, $R_5$, $R_6$, and $R_7$ each independently represent a hydrogen atom, an optionally substituted alkyl group, an optionally substituted aryl group, an optionally substituted heterocyclic group, an optionally substituted sulfonyl group, or an optionally substituted acyl group; $R_4$, $R_5$, $R_6$, and $R_7$ may be the same or different, $R_4$ and $R_5$ are not simultaneously hydrogen atoms, and $R_6$ and $R_7$ are not simultaneously hydrogen atoms; and $A_1$ and $A_2$ both represent optionally substituted carbon atoms, or one of $A_1$ and $A_2$ represents an optionally substituted carbon atom and the other represents a nitrogen atom;

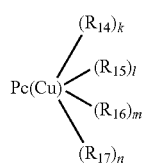

(C-1)

wherein the general formula (C-1),

Pc(Cu) represents a copper phthalocyanine nucleus represented by the following general formula (Pc);

$R_{14}$, $R_{15}$, $R_{16}$, and $R_{17}$ each independently represent a substituent selected from the group consisting of —$SO_2R_a$, —$SO_2NR_bR_c$, and —$CO_2R_a$, $R_{14}$; $R_{15}$, $R_{16}$, and $R_{17}$ are not simultaneously the same, at least one of $R_{14}$, $R_{15}$, $R_{16}$, and $R_{17}$ has an ionic hydrophilic group as a substituent, at least one of $R_{14}$, $R_{15}$, $R_{16}$, and $R_{17}$ is present on each of the four benzene rings A, B, C, and D of the copper phthalocyanine nucleus represented by the following general formula (Pc);

$R_a$ represents an optionally substituted alkyl group;

$R_b$ represents a hydrogen atom or an optionally substituted alkyl group;

$R_c$ represents an optionally substituted alkyl group;

k is a number satisfying 0<k<8;

l is a number satisfying 0<l<8;

m is a number satisfying 0≦m<8;

n is a number satisfying 0≦n<8; and k, l, m, and n are numbers satisfying 4<k+l+m+n≦8;

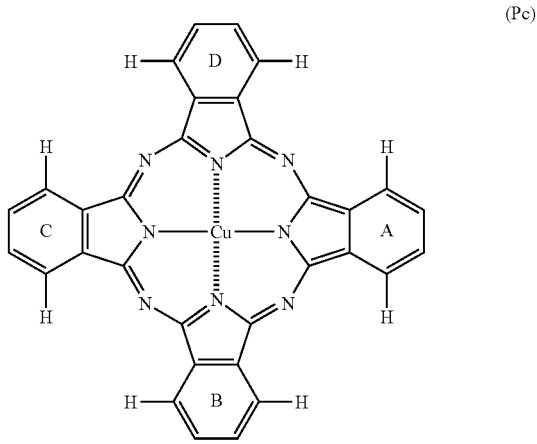

(Pc)

(C-2)

wherein the general formula (C-2),

Pc (Cu) represents the cooper phthalocyanine nucleus represented by the general formula (Pc);

s is a number satisfying 0<s<4;

t is a number satisfying 0<t<4;

s and t are numbers satisfying 2≦s+t≦5;

an $SO_3M$ group is present on any of four benzene rings A, B, C and D of the copper phthalocyanine nucleus represented by the general formula (Pc);

an $SO_2NH_2$ group is present on any of four benzene rings A, B, C and D of the copper phthalocyanine nucleus represented by the general formula (Pc); and M represents a lithium ion, a sodium ion, a potassium ion, or an ammonium ion.

2. The ink set according to claim 1, wherein a greatest difference of the OD value reduction rate (%) among conditions of (I) to (IV) is 10 or less in any of the yellow component, the magenta component, and the cyan component when the ozone resistance evaluation test is carried out on the composite black patch formed on the glossy paper by the yellow ink, the magenta ink, and the cyan ink in the conditions of (I) to (IV).

3. The ink set according to claim 1, wherein the ink set includes following properties (a) to (c) in each of conditions of (I) to (IV) when the ozone resistance evaluation test is carried out on a mono-color yellow patch, a mono-color magenta patch, and a mono-color cyan patch formed on the glossy paper by the yellow ink, the magenta ink, and the cyan ink in the conditions of (I) to (IV), (a) about $-10 \leq B_Y - B_M \leq$ about 20
(b) about $-10 \leq B_Y - B_C \leq$ about 20
(c) about $-10 \leq B_M - B_C \leq$ about 15

$B_Y$: OD value reduction rate (%) of mono-color yellow patch
$B_M$: OD value reduction rate (%) of mono-color magenta patch
$B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test
$OD_{Y1}$: OD value of mono-color yellow patch after ozone resistance evaluation test
$OD_{M0}$: OD value of mono-color magenta patch before ozone resistance evaluation test
$OD_{M1}$: OD value of mono-color magenta patch after ozone resistance evaluation test
$OD_{C0}$: OD value of mono-color cyan patch before ozone resistance evaluation test
$OD_{C1}$: OD value of mono-color cyan patch after ozone resistance evaluation test.

4. The ink set according to claim 1, wherein the ink set includes following properties (d) to (f) in each of conditions of (I) to (IV) when the ozone resistance evaluation test is carried out on a mono-color yellow patch, a mono-color magenta patch, and a mono-color cyan patch formed on the glossy paper by the yellow ink, the magenta ink, and the cyan ink in the conditions of (I) to (IV), (d) about $-10 \leq B_Y - B_M \leq$ about 10
(e) about $-10 \leq B_Y - B_C \leq$ about 10
(f) about $-10 \leq B_M - B_C \leq$ about 15

$B_Y$: OD value reduction rate (%) of mono-color yellow patch
$B_M$: OD value reduction rate (%) of mono-color magenta patch
$B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test
$OD_{Y1}$: OD value of mono-color yellow patch after ozone resistance evaluation test
$OD_{M0}$: OD value of mono-color magenta patch before ozone resistance evaluation test
$OD_{M1}$: OD value of mono-color magenta patch after ozone resistance evaluation test
$OD_{C0}$: OD value of mono-color cyan patch before ozone resistance evaluation test
$OD_{C1}$: OD value of mono-color cyan patch after ozone resistance evaluation test.

5. The ink set according to claim 1, wherein a greatest difference of an OD value reduction rate (%) among conditions of (I) to (IV) is 20 or less in each of the mono-color yellow patch, the mono-color magenta patch, and the mono-color cyan patch when the ozone resistance evaluation test is carried out on the mono-color yellow patch, the mono-color magenta patch, and the mono-color cyan patch formed on the glossy paper by the yellow ink, the magenta ink, and the cyan ink in the conditions of (I) to (IV).

6. The ink set according to claim 1, wherein the yellow ink, the magenta ink, and the cyan ink each comprise water, a coloring agent, and a water-soluble organic solvent.

7. An ink jet recording apparatus comprising the ink set of claim 1 for forming a composite black image by mixing or overstriking the yellow ink, the magenta ink, and the cyan ink, which composite black image is less prone to developing color over time, wherein the ink jet recording apparatus comprises:

a yellow ink storage portion;
a magenta ink storage portion; and
a cyan ink storage portion, wherein the yellow ink is mounted to the yellow ink storage portion, the magenta ink is mounted to the magenta ink storage portion, and the cyan ink is mounted to the cyan ink storage portion.

8. The ink jet recording apparatus according to claim 7, wherein a greatest difference of the OD value reduction rate (%) among conditions of (I) to (IV) is 10 or less in each of the yellow component, the magenta component, and the cyan component when the ozone resistance evaluation test is carried out on the composite black patch formed on the glossy paper by the yellow ink, the magenta ink, and the cyan ink.

9. The ink jet recording apparatus according to claim 7, wherein the ink set includes following properties (a) to (c) in each of conditions (I) to (IV) when the ozone resistance evaluation test is carried out on a mono-color yellow patch, a mono-color magenta patch, and a mono-color cyan patch formed on the glossy paper by the yellow ink, the magenta ink, and the cyan ink, (a) about $-10 \leq B_Y - B_M \leq$ about 20
(b) about $-10 \leq B_Y - B_C \leq$ about 20
(c) about $-10 \leq B_M - B_C <$ about 15

$B_Y$: OD value reduction rate (%) of mono-color yellow patch
$B_M$: OD value reduction rate (%) of mono-color magenta patch
$B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test
$OD_{Y1}$: OD value of mono-color yellow patch after ozone resistance evaluation test
$OD_{M0}$: OD value of mono-color magenta patch before ozone resistance evaluation test
$OD_{M1}$: OD value of mono-color magenta patch after ozone resistance evaluation test
$OD_{C0}$: OD value of mono-color cyan patch before ozone resistance evaluation test
$OD_{C1}$: OD value of mono-color cyan patch after ozone resistance evaluation test.

10. The ink jet recording apparatus according to claim 7, wherein the ink set includes following properties (d) to (f) in each of conditions of (I) to (IV) when the ozone resistance evaluation test is carried out on a mono-color yellow patch, a mono-color magenta patch, and a mono-color cyan patch formed on the glossy paper by the yellow ink, the magenta ink, and the cyan ink, (d) about $-10 \leq B_Y - B_M \leq$ about 10
(e) about $-10 \leq B_Y - B_C \leq$ about 10
(f) about $-10 \leq B_M - B_C \leq$ about 15

$B_Y$: OD value reduction rate (%) of mono-color yellow patch
$B_M$: OD value reduction rate (%) of mono-color magenta patch
$B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test
$OD_{Y1}$: OD value of mono-color yellow patch after ozone resistance evaluation test
$OD_{M0}$: OD value of mono-color magenta patch before ozone resistance evaluation test
$OD_{M1}$: OD value of mono-color magenta patch after ozone resistance evaluation test
$OD_{C0}$: OD value of mono-color cyan patch before ozone resistance evaluation test
$OD_{C1}$: OD value of mono-color cyan patch after ozone resistance evaluation test.

11. The ink jet recording apparatus according to claim 7, wherein a greatest difference of an OD value reduction rate (%) among conditions of (I) to (IV) is 20 or less in each of the mono-color yellow patch, the mono-color magenta patch, and the mono-color cyan patch when the ozone resistance evaluation test is carried out on the mono-color yellow patch, the mono-color magenta patch, and the mono-color cyan patch formed on the glossy paper by the yellow ink, the magenta ink, and the cyan ink.

12. A method of ink jet recording for forming a composite black image by mixing or overstriking yellow ink, magenta ink, and cyan ink, which composite black image is less prone to developing color over time, the method comprising performing ink jet recording with an ink set for ink-jet recording of claim 1.

13. The method of ink-jet recording according to claim 12, wherein a greatest difference of the OD value reduction rate (%) among conditions of (I) to (IV) is 10 or less in each of the yellow component, the magenta component, and the cyan component when the ozone resistance evaluation test is carried out on the composite black patch formed on the glossy paper by the yellow ink, the magenta ink, and the cyan ink.

14. The method of ink jet recording according to claim 12, wherein the ink set includes following properties (a) to (c) in each conditions of (I) to (IV) when the ozone resistance evaluation test is carried out on a mono-color yellow patch, a mono-color magenta patch, and a mono-color cyan patch formed on the glossy paper by the yellow ink, the magenta ink, and the cyan ink, (a) about $-10 \leq B_Y - B_M \leq$ about 20
(b) about $-10 \leq B_Y - B_C \leq$ about 20
(c) about $-10 \leq B_M - B_C \leq$ about 15

$B_Y$: OD value reduction rate (%) of mono-color yellow patch
$B_M$: OD value reduction rate (%) of mono-color magenta patch
$B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test
$OD_{Y1}$: OD value of mono-color yellow patch after ozone resistance evaluation test
$OD_{M0}$: OD value of mono-color magenta patch before ozone resistance evaluation test
$OD_{M1}$: OD value of mono-color magenta patch after ozone resistance evaluation test
$OD_{C0}$: OD value of mono-color cyan patch before ozone resistance evaluation test
$OD_{C1}$: OD value of mono-color cyan patch after ozone resistance evaluation test.

15. The method of ink-jet recording according to claim 12, wherein a greatest difference of an OD value reduction rate (%) among conditions of (I) to (IV) is 20 or less in each of the mono-color yellow patch, the mono-color magenta patch, and the mono-color cyan patch when the ozone resistance evaluation test is carried out on the mono-color yellow patch, the mono-color magenta patch, and the mono-color cyan patch formed on the glossy paper by the yellow ink, the magenta ink, and the cyan ink.

16. A method of evaluating an ink set for ink-jet recording of claim 1 comprising:
   forming a composite black patch on a glossy paper by mixing or overstriking the yellow ink, the magenta ink, and the cyan ink; and
   evaluating the composite black patch for ozone resistance in conditions of (I) to (IV) and obtaining an OD value reduction rate (%) of a yellow component, a magenta component, and a cyan component of the composite black patch.

17. A method of manufacturing an ink set for ink-jet recording of claim 1 comprising:
   forming a composite black patch on a glossy paper by mixing or overstriking the yellow ink, the magenta ink, and the cyan ink; and
   evaluating the composite black patch for ozone resistance in conditions of (I) to (IV) and obtaining an OD value reduction rate (%) of a yellow component, a magenta component, and a cyan component of the composite black patch; and
   selecting a combination of yellow ink, magenta ink, and cyan ink such that a greatest difference of an OD value reduction rate (%) among the yellow component, the magenta component, and the cyan component of the composite black patch is 10 or less in each of conditions of (I) to (IV).

18. The method of manufacturing the ink set for ink jet recording according to claim 17, wherein
   an ink set is selected which includes the following properties (a) to (c) in each of conditions of (I) to (IV),
   (a) about $-10 \leq B_Y - B_M \leq$ about 20
   (b) about $-10 \leq B_Y - B_C \leq$ about 20
   (c) about $-10 \leq B_M - B_C \leq$ about 15

$B_Y$: OD value reduction rate (%) of mono-color yellow patch
$B_M$: OD value reduction rate (%) of mono-color magenta patch $B_C$: OD value reduction rate (%) of mono-color cyan patch $$B_Y = ((OD_{Y0} - OD_{Y1})/OD_{Y0}) \times 100$$

$$B_M = ((OD_{M0} - OD_{M1})/OD_{M0}) \times 100$$

$$B_C = ((OD_{C0} - OD_{C1})/OD_{C0}) \times 100$$

$OD_{Y0}$: OD value of mono-color yellow patch before ozone resistance evaluation test $OD_{Y1}$: OD value of mono-color yellow patch after ozone resistance evaluation test $OD_{M0}$: OD value of mono-color magenta patch before ozone resistance evaluation test $OD_{M1}$: OD value of mono-color magenta patch after ozone resistance evaluation test $OD_{C0}$: OD value of mono-color cyan patch before ozone resistance evaluation test $OD_{C1}$: OD value of mono-color cyan patch after ozone resistance evaluation test 19. The method of manufacturing the ink set for ink jet recording according to claim 17, further comprising forming a mono-color yellow patch, a mono-color magenta patch, and a mono-color cyan patch on the glossy paper by the yellow ink, the magenta ink, and the cyan ink;

evaluating ozone resistance on the mono-color yellow patch, the mono-color magenta patch, and the mono-color cyan patch in the conditions of (I) to (IV); and selecting the ink set in which a greatest difference of an OD value reduction rate (%) among conditions of (I) to (IV) is 20 or less in each of the mono-color yellow patch, the mono-color magenta patch, and the mono-color cyan patch.

* * * * *